US012466703B2

(12) United States Patent
Baskett et al.

(10) Patent No.: US 12,466,703 B2
(45) Date of Patent: Nov. 11, 2025

(54) DYNAMIC COUNTERBALANCE ADJUSTMENT FOR TELESCOPING CRANES

(71) Applicant: CHAPMAN/LEONARD STUDIO EQUIPMENT, INC., North Hollywood, CA (US)

(72) Inventors: Graham Baskett, Glendale, CA (US); Charles L. Huenergardt, Los Angeles, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 264 days.

(21) Appl. No.: 18/327,639

(22) Filed: Jun. 1, 2023

(65) Prior Publication Data

US 2024/0400353 A1 Dec. 5, 2024

(51) Int. Cl.

| | |
|---|---|
| ***B66C 23/72*** | (2006.01) |
| ***B66C 23/70*** | (2006.01) |
| ***B66F 11/04*** | (2006.01) |

(52) U.S. Cl.
CPC ............ *B66C 23/72* (2013.01); *B66C 23/701* (2013.01); *B66F 11/048* (2013.01)

(58) Field of Classification Search
None
See application file for complete search history.

(56) References Cited

U.S. PATENT DOCUMENTS

| | | | |
|---|---|---|---|
| 5,033,705 A | 7/1991 | Reagan | |
| 5,697,757 A | 12/1997 | Lindsay | |
| 8,251,599 B2 | 8/2012 | Chapman | |
| 8,333,520 B1 | 12/2012 | Cronin et al. | |
| 10,146,108 B2 | 12/2018 | Chapman | |
| 10,214,397 B2 | 2/2019 | Valles Navarro et al. | |
| 2003/0076480 A1 * | 4/2003 | Burbulla ............... | B66F 11/048 396/419 |

FOREIGN PATENT DOCUMENTS

| | | | |
|---|---|---|---|
| EP | 2228682 A1 | 9/2010 | |
| EP | 2397436 A1 | 12/2011 | |
| EP | 3078625 B1 | 2/2018 | |
| WO | WO-2010092194 A1 * | 8/2010 | ............. B66C 23/72 |

OTHER PUBLICATIONS

Examination Report for European Application No. 24178113.7; Date of Mailing: Mar. 30, 2024; 5 pages.

* cited by examiner

*Primary Examiner* — Rodney E Fuller
(74) *Attorney, Agent, or Firm* — Perkins Coie LLP

(57) ABSTRACT

A telescoping crane has an adjustable, pivoting payload, and a counterbalance mechanism that automatically compensates for the position of the telescoping crane and movement of the payload relative to the crane.

22 Claims, 4 Drawing Sheets

DYNAMIC COUNTERBALANCE ADJUSTMENT FOR TELESCOPING CRANES

BACKGROUND OF THE INVENTION

Telescoping cranes having extendable arms are used for film production, equipment inspection, construction, and other applications. The payload is placed at the front end of the crane arm. Relative to camera cranes, the payload is often a remotely steered camera mount or camera head supporting a camera. In other applications the payload may be an inspection sensor, a paint spray nozzle, or other tool or device. Typically, the weight of the payload is initially counterbalanced by manually adding or removing counterweights to or from the back end of the crane arm. A counterbalance weight carrier or tray automatically moves rearwardly as the crane arm telescopically extends forward. The center of mass of the crane arm and the payload remains at the axle or pivot point of the crane arm, regardless of the telescoping extension and retraction of the crane arm. Consequently, the crane arm remains balanced. However, if the position of the payload relative to the crane arm changes, for example, if the payload rotates, or moves in the front/back direction relative to the crane arm, the crane arm may become unbalanced. Accordingly, there is a need for a telescoping crane arm that can remain balanced, regardless of the changes in payload position and/orientation.

BRIEF DESCRIPTION OF THE DRAWINGS

In the drawings, the same reference number indicates the same element in each of the views.

DETAILED DESCRIPTION

An improved telescoping crane arm maintains the center of balance about the crane arm axle or pivot point even with changes in the position of the local center of mass of the payload, without any input from the crane operator. This is performed via a mechanism or linkage which adjusts the position of the counterweight carrier to compensate for the shift in the local center of mass of the payload. For example, a linear actuator may be integrated with the counterweight carrier cable system that adjusts the neutral position of the counterweight carrier. An independent servo system may control the position of the counterweight carrier.

The payload can be placed on an adjustable mount that can be changed by a controller, directed manually by a human operator, or automatically via computer controller. Moving the adjustable payload mount adjusts the center of mass of the system, i.e., the combination of the crane arm and the payload.

Figure 1:
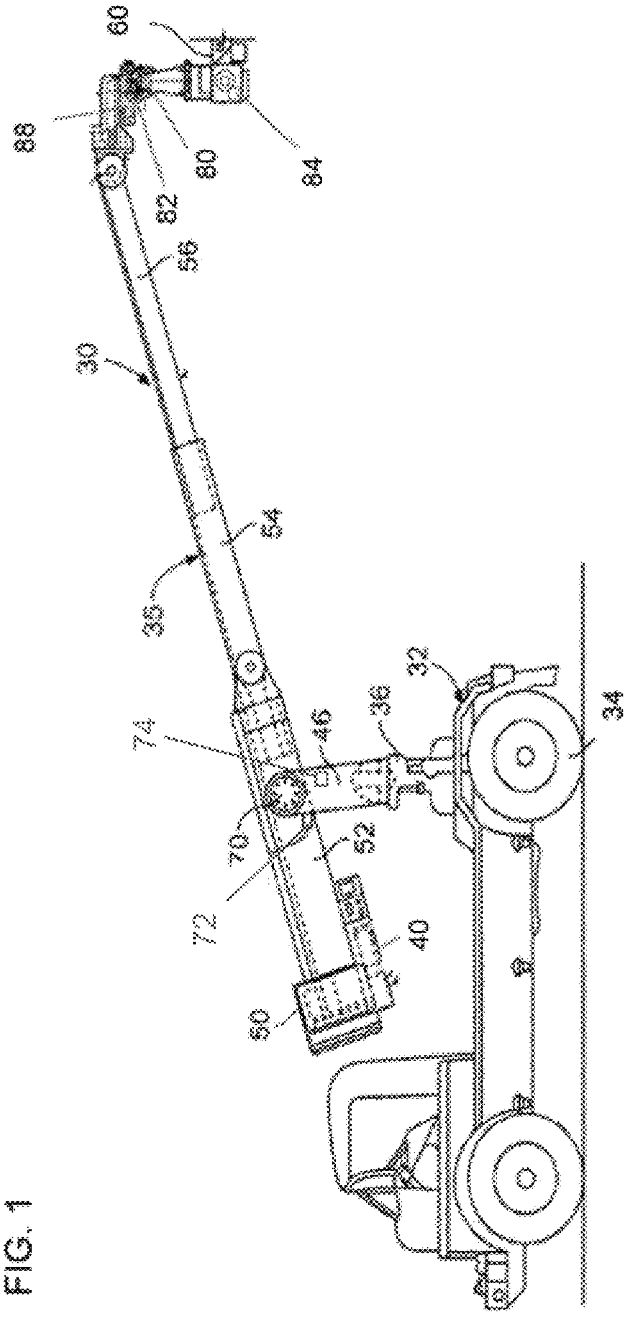
FIG. 1 is a side view of a telescoping camera crane.

As one example, the drawings show the invention as used on a telescoping camera crane. However, the invention may of course also be used on other types of telescoping cranes as well. FIG. 1 shows a camera crane 30 having a fully extended telescoping crane arm 35 mounted onto a mobile base 32, as described in U.S. Pat. No. 8,251,599 B2, incorporated herein by reference. The mobile base 32 may be a truck or road vehicle, or a motorized special purpose camera crane base or dolly. Typically, the mobile base 32 has an internal combustion motor and/or electric motors which drive the wheels 34, optionally with all-wheel drive and/or all-wheel steering. Smaller cranes may be moved by manually pushing an unmotorized mobile base or dolly.

A first section or outer tube 52 of the crane arm 35 is mounted on tilt axle stubs 70 in a U-shaped frame 46, which is rotatably mounted on a column 36, so the crane arm 35 can move in the tilt and pan axes. A second section or tube 54 is mechanically linked to a counterweight carrier 50 which is movable along the top of the first section 52 of the crane arm 35. A third section or tube 56 is mechanically linked to the second section 54. An actuator drives the tube sections 54 and 56 in the front/back direction on the first section 52. As the tube sections 54 and 56 telescopically extend forward, the counterweight carrier moves backwards, and vice versa, to keep the crane arm balanced. Additional inner tubes may be used, to provide greater telescoping distance. Typically, the counterweight carrier 50 is mechanically linked to the second section or inner tube 54 via cables extending around pulleys inside of the outer tube 52. As a result, the counterweight carrier 50 and the telescoping sections of the crane arm 35 automatically move in opposite directions, but they cannot move independently of each other.

Relative to camera cranes, the payload 60 may be a camera mounted on a remotely controlled camera head attached to the front end of the crane arm 35 at a pivot mount 80. The camera head typically has a camera platform movable at least in a tilt axis and a pan axis. Some camera heads also have roll axis movement. One or more electric pivot motors 88 can pivot or rotate the payload through various payload angles, from the head down position shown in FIG. 2A to or through the head center position shown in FIG. 2B, and into the head up position shown in FIG. 2C.

Figures 2A, 2B, 2C:
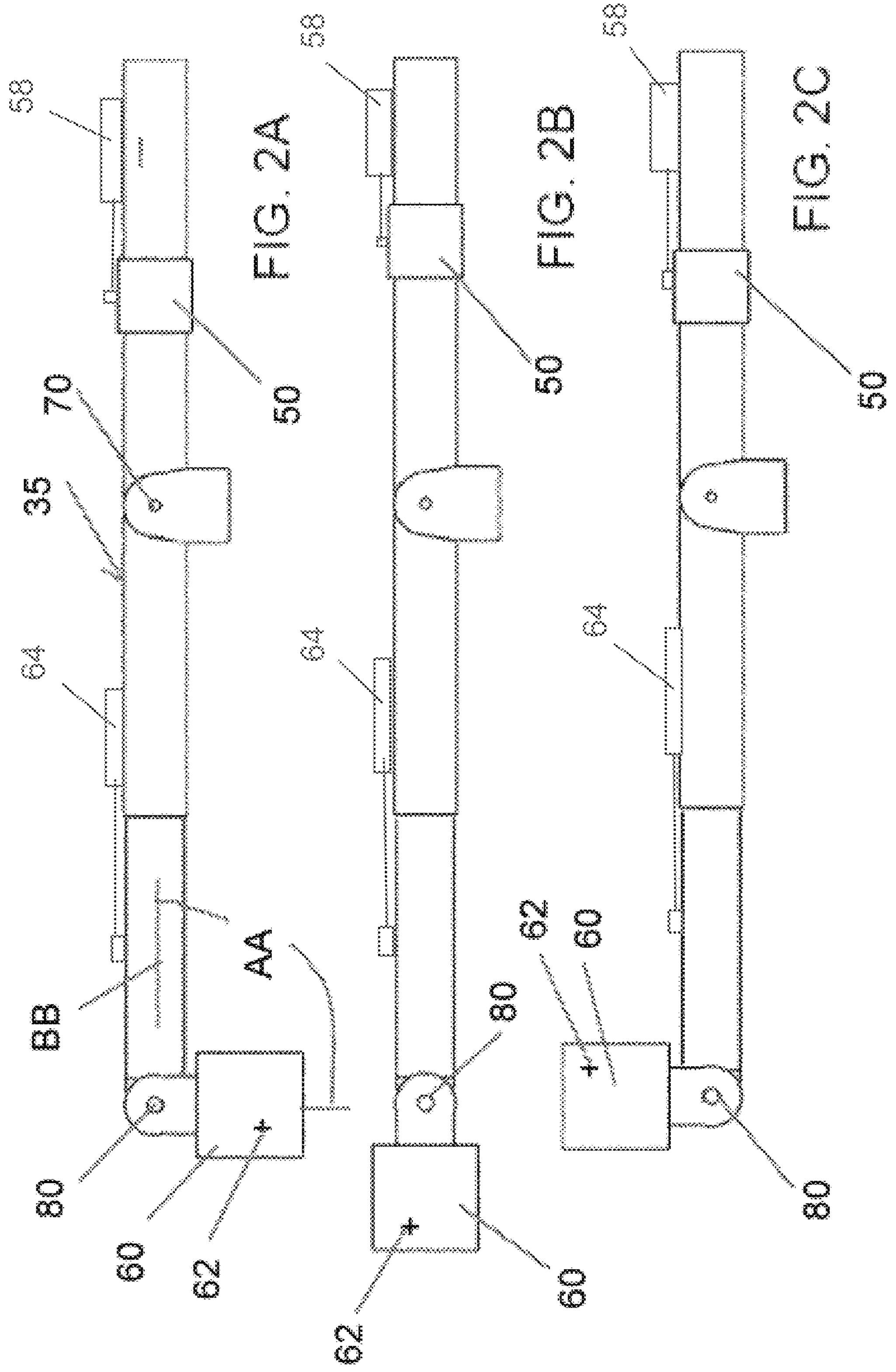
FIG. 2A is a schematic diagram of a first embodiment of a telescoping crane arm with a payload in a first position and a counterweight carrier in a first position.
FIG. 2B is a schematic diagram of the telescoping crane arm of FIG. 2A with the payload in a second position and the counterweight carrier in a second position.
FIG. 2C is a schematic diagram of a telescoping crane arm of FIG. 2A with the payload in a third position and the counterweight carrier in the first position.

The electric pivot motors are typically contained within the camera head and are remotely controlled by the camera crane operator. Referring to FIGS. 2A, 2B and 2C, the pivoting movement of the camera head or payload 60 changes the center of mass of the combined crane arm 35 and payload 60, i.e. the balanced system 30, causing it to become unbalanced. Specifically, in FIG. 2B, the local center of mass of the payload 62 is shifted forward from its position in FIGS. 2A and 2C. The movement of the counterweight carrier 50 compensates for the telescoping extension and retraction of the crane arm 35, but not for the unbalanced condition resulting from the pivoting movement of the payload 60. Thus, in conventional telescoping cranes movement or rotation of the payload causes the crane to become unbalanced. The unbalanced condition can result in unexpected tilt up or tilt down movements, potentially creating a hazard operating crews and equipment.

The improved telescoping camera crane 30 shown in the Figures overcomes this problem by applying a rectifying or corrective torque to the crane arm 35 about the pivot axle 70 to compensate for both imbalance due a shifting payload, and for the telescoping crane sections. This can be achieved in several different ways.

In a first embodiment, a first sensor 82 and/or a second sensor 84 is electrically connected to the computer controller 40 to measure the mass (or weight) of the payload 60 and the payload angle AA of the payload relative to the crane axis BB. Using these sensor outputs, the computer controller calculates the position of the local center of mass 62 of the payload. The sensors 82 and/or 84, or an alternative third or extension sensor 72, also detects the extension of the crane arm 35, or the extension is maintained in a memory of the computer controller 40. A fourth or tilt sensor 74 measures the tilt angle of the crane arm 35. The distance to the local center of mass 62 of the payload to the pivot mount 80 is known or measured and used as an additional input to the computer controller 40. The computer controller 40 may perform a calibration procedure to calculate the distance to the payload's center of mass from the payload pivot mount 80. This calibration involves pivoting the payload 60 through a range of motion and measuring the torque required to maintain the orientation of the payload 60 relative to the crane arm 35 and the direction of gravity.

Figure 5:
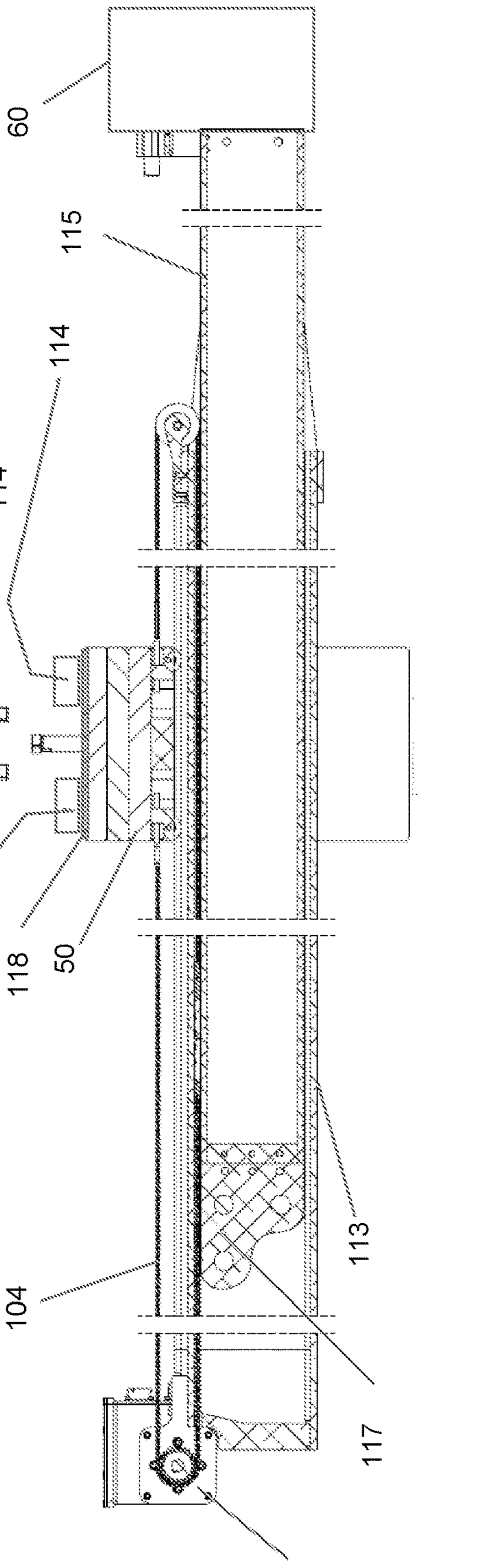
FIG. 5 is a side view of the embodiment of FIG. 4.

In the embodiment of FIGS. 2A, 2B and 2C, the computer controller 40 controls a first actuator 58 to move the counterweight carrier 50 to a position which maintains the system 30 in balance. The actuator may be a linear actuator, as in U.S. Pat. No. 8,251,599, or a rotary actuator 102 as shown in FIG. 5, and described in U.S. Pat. No. 10,146,108, incorporated herein by reference. The first actuator 58 may be mechanically linked to the counterweight carrier 50 via a cable or a chain, a lead screw, rack and pinion, etc. In the design of FIGS. 2A, 2B and 2C, unlike in U.S. Pat. Nos. 8,251,599 and 10,146,108, the counterweight carrier 50 is not mechanically linked to the second section 54 (or any of the sections). Thus, movement of the counterweight carrier 50 by the first actuator 58 is independent of the telescoping movement of the crane arm 35. Specifically, telescoping movement may be provided via second, separate actuator 64 mechanically linked to the second section 54. In this case, the computer controller may separately control and drive the first actuator 58 which only moves the counterweight carrier 50, and the second actuator 64 mechanically linked to the second section 54 (or other section(s)) to provide telescoping extension and retraction movement.

Figures 3A, 3B, 3C:
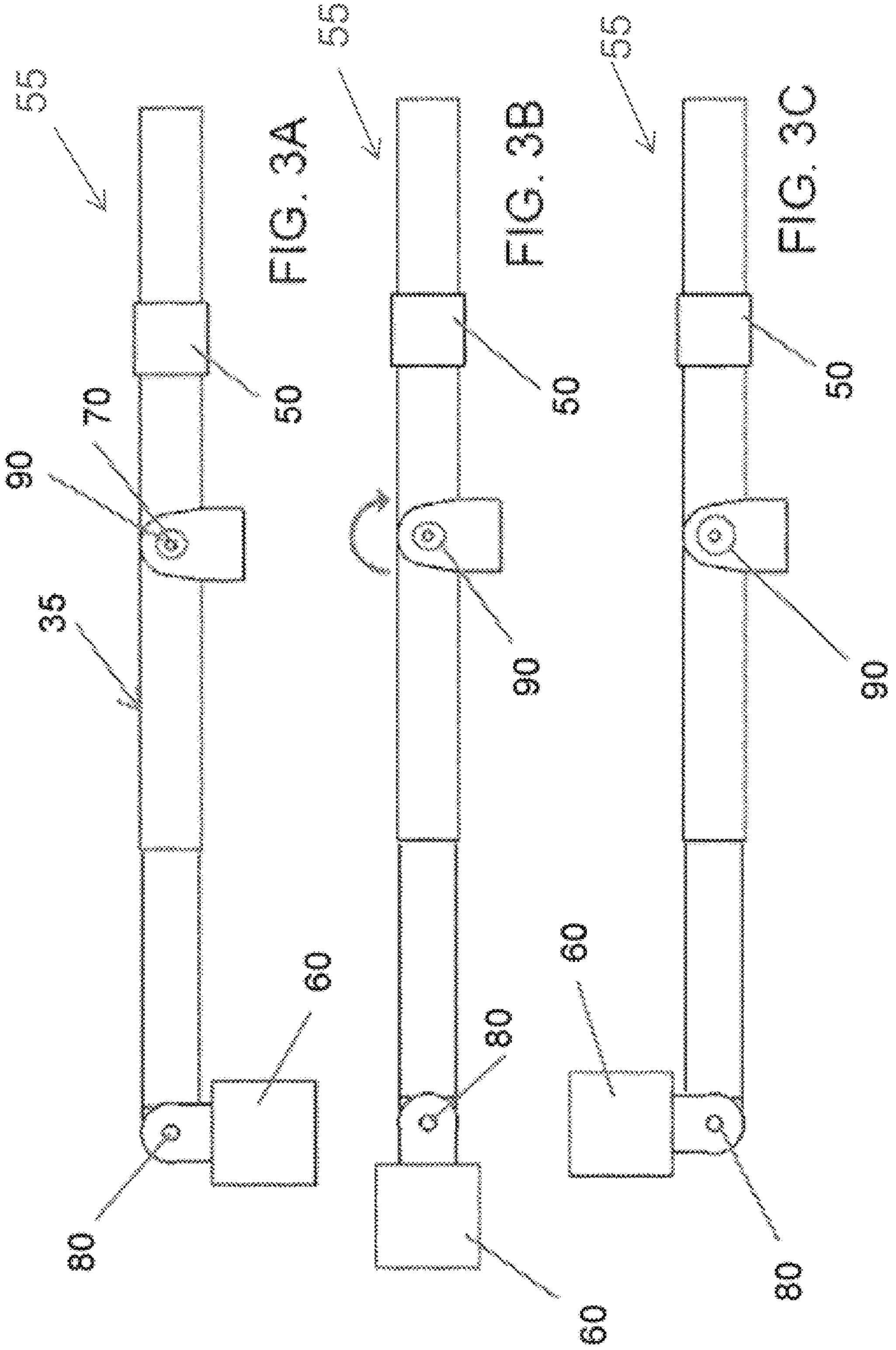
FIG. 3A is a schematic diagram of a second embodiment of a telescoping crane arm with a payload in the first position and a counterweight carrier in a first position.
FIG. 3B is a schematic diagram of the telescoping crane arm of FIG. 3A with the payload in a second position and the counterweight carrier in the first position.
FIG. 3C is a schematic diagram of the telescoping crane arm of FIG. 3A with the payload in a third position and the counterweight carrier in the first position.

Referring to FIGS. 3A, 3B and 3C, in this embodiment, a payload system 55 is configured to compensate for an imbalance caused by a shift in the position of the payload 60. The payload system 55 includes an electric axle motor 90, sensors 82 and/or 84, electrically connected to the computer controller 40. The sensor(s) detect a shift in position of the payload center of mass 62. Based on input from the sensor(s), the computer controller 40 controls the electric axle motor 90 to apply a rectifying torque to the crane arm 35 at the tilt axle 70 to compensate for the imbalance due to the payload pivoting or moving relative to the crane arm, as shown in FIGS. 3A, 3B and 3C. The payload system 55 can be retrofit onto existing telescoping cranes, such as described in U.S. Pat. No. 8,251,599, and similar telescoping camera cranes. In this case, the existing counterweight carrier and linkage to the tube sections 54 and 56, or 115, maintain the crane arm in balance as the crane arm telescopically extends or retracts, as with conventional telescoping camera cranes, while the payload system 55 independently compensates for imbalance from a shift in position of the payload. The electric axle motor 90 may be linked to the crane arm 35 through a gear reduction. An electronic or a manual tilt axis brake may be used to temporarily hold the crane arm at a fixed tilt angle, i.e., the angle between the longitudinal axis of the crane arm and the ground as shown in FIG. 1.

In an alternative design the payload system 55 may have an electric axle motor 90 which by itself, exerts torque on the crane arm to keep the crane arm in balance. In this case, no counterweight carrier is used or needed. The present concepts may also be used to balance a crane arm (fixed length or telescopic) subject to balance shifting events, such as a change in the weight or longitudinal position of the payload, buoyancy forces if the payload is immersed in water, accessories placed onto the crane arm, etc.

Figure 4:
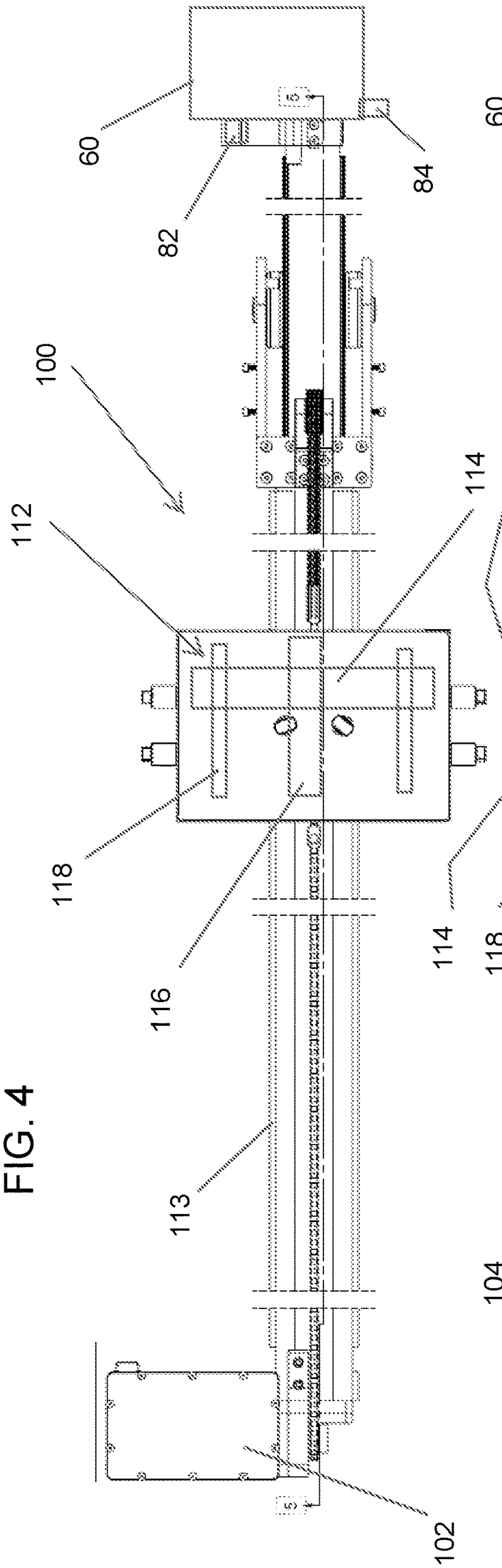
FIG. 4 is a top view of the third embodiment.

FIGS. 4 and 5 show a crane 100 having a single telescoping section or inner tube 115. The ends of a belt (or a chain) 104 are attached to opposite ends of a primary counterweight carrier 50. The belt 104 extends around a sprocket driven by a first actuator or electric motor 102. The back end 117 of the inner tube 115 is attached to the belt 104. Counterclockwise rotation of the electric motor 102 drives the inner tube 115 forward with the inner tube 115 telescopically extending out of the outer tube 113. A payload system 112 includes a secondary counterweight carrier 114 is movable on the top of a primary counterweight carrier 50 between the front and back positions shown in FIG. 5. Sensors 82 and/or 84 electrically connected to the computer controller 40 measure the local center of mass of the payload 60. The computer controller 40 controls the electric motor 102 which extends and retracts the inner tube or section 115 and simultaneously moves the primary counterweight carrier 50 to compensate for the extension/retraction of the inner tube or section 115. The computer controller 40 also controls a second actuator 116 attached to the secondary counterweight carrier 114, to position the secondary counterweight carrier 114 at a position which compensates for a change in position of the local center of mass of the payload 60. The secondary counterweight carrier 114 may optionally roll on tracks 118.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A telescoping crane arm, comprising:

a telescoping crane arm having an outer section and one or more telescoping inner sections;

a counterweight carrier movable on the outer section, the counterweight carrier linked to at least one of the telescoping inner sections;

an actuator for simultaneously moving at least one of the counterweight carrier and at least one of the telescoping inner sections in opposite directions;

a payload at a first end of the crane arm;

at least one sensor for sensing a position of the payload;

an electric motor configured to apply torque to the outer section; and a computer controller electrically connected to the at least one sensor and to the electric motor, the computer controller controlling the electric motor to compensate for an imbalance due to movement of the payload.

2. The telescoping crane arm of claim 1 wherein the outer section is mounted on an axle supported on a frame to allow tilt movement of the crane arm, and the electric motor is configured to apply torque about the axle.

3. The telescoping crane arm of claim 1 wherein the at least one sensor is configured to provide an output indicative of a local center of mass of the payload.

4. The telescoping crane arm of claim 1 wherein the payload is pivotally attached to a front end of one of the inner sections and is movable from a head down position, through a center position, to a head up position.

5. The telescoping crane arm of claim 1 having a tilt sensor for sensing a tilt angle of the crane arm, an extension sensor for sensing an extension of the crane arm, and a local center of mass sensor providing an output indicative of a local center of mass of the payload, each of the sensors electrically connected to the computer controller.

6. The telescoping crane arm of claim 1 wherein the payload comprises a remotely controlled camera head having a camera platform movable at least in a tilt axis and a pan axis.

7. The telescoping crane of claim 1 wherein the computer controller controls torque applied by the electric motor based on payload weight, payload angle, arm tilt angle, and arm extension.

8. A telescoping crane arm, comprising:
- an outer section and one or more telescoping inner sections;
- a primary counterweight linked to one of the inner sections, the primary counterweight movable on the outer section;
- a first actuator linked to the primary counterweight;
- a second actuator linked to a secondary counterweight;
- a payload at a first end of the crane arm;
- at least one sensor having an output used for sensing a position of the payload; and
- a computer controller electrically connected to the at least one sensor and to the second actuator, the computer controller configured to control the second actuator to apply torque to the outer section by moving the secondary counterweight, to compensate for an imbalance due to a change in position of a local center of mass of the payload.

9. The telescoping crane arm of claim 8 wherein the secondary counterweight is movable on top of the primary counterweight.

10. The telescoping crane arm of claim 8 wherein the payload is pivotally attached to a front end of one of the inner sections and is movable from a head down position, through a center position, to a head up position.

11. The telescoping crane arm of claim 8 having a tilt sensor for sensing a tilt angle of the crane arm, an extension sensor for sensing an extension of the crane arm, and a a local center of mass sensor providing an output indicative of a local center of mass of the payload, each of the sensors electrically connected to the computer controller.

12. The telescoping crane arm of claim 8 wherein the payload comprises a remotely controlled camera head having a camera platform movable at least in a tilt axis and a pan axis.

13. A telescoping crane, comprising:
- a base;
- a telescoping crane arm pivotally attached to the base, the crane arm having an outer section and one or more telescoping inner sections;
- a payload at a first end of the telescoping crane arm;
- at least one sensor having an output used for sensing a position of the payload;
- an electric motor configured to apply torque to the outer section; and
- a computer controller electrically connected to the at least one sensor and to the electric motor, the computer controller controlling the electric motor to compensate for an imbalance due to movement of the payload.

14. The telescoping crane of claim 13 wherein the outer section is mounted on an axle supported on a frame to allow tilt movement of the crane arm, and the electric motor is configured to apply torque about the axle.

15. The telescoping crane of claim 14 wherein the at least one sensor is configured to provide an output indicative of a local center of mass of the payload.

16. The telescoping crane of claim 14 wherein the payload is pivotally attached to a front end of one of the inner sections and is movable from a head down position, through a center position, to a head up position.

17. The telescoping crane of claim 13 having a tilt sensor for sensing a tilt angle of the crane arm, an extension sensor for sensing an extension of the crane arm, and a a local center of mass sensor providing an output indicative of a local center of mass of the payload, each of the sensors electrically connected to the computer controller.

18. The telescoping crane of claim 13 wherein the payload comprises a remotely controlled camera head having a camera platform movable at least in a tilt axis and a pan axis.

19. A camera crane, comprising:
- a counterweight movable on a crane arm;
- an actuator for moving the counterweight;
- a payload at a first end of the crane arm;
- at least one sensor having an output used for sensing a position of the payload;
- an electric motor configured to apply torque to the crane arm; and
- a computer controller electrically connected to the at least one sensor and to the electric motor, the computer controller controlling the electric motor to compensate for an imbalance due to movement of the payload.

20. A telescoping crane arm, comprising:
- a base;
- a telescoping crane arm pivotally attached to the base, the crane arm having an outer section and one or more telescoping inner sections;
- a counterweight movable on the outer section;
- an actuator linked to the counterweight;
- a payload at a first end of the telescoping crane arm;
- a first sensor for measuring a weight of the payload;
- a second sensor for measuring an angle of the payload; and
- a computer controller electrically connected to the first sensor and to the second sensor, and to the actuator, the computer controller controlling the actuator to compensate for an imbalance due to movement of a local center of mass of the payload.

21. The telescoping crane arm of claim 20 wherein the payload is pivotally attached to a front end of one of the inner sections and is movable from a head down position, through a center position, to a head up position.

22. The telescoping crane arm of claim 20 having a tilt sensor for sensing a tilt angle of the crane arm, an arm extension sensor for sensing an extension of the crane arm, electrically connected to the computer controller.

* * * * *